US008014066B2

(12) United States Patent
Teather et al.

(10) Patent No.: US 8,014,066 B2
(45) Date of Patent: Sep. 6, 2011

(54) REFLECTION-TYPE PROJECTION SCREEN

(75) Inventors: Eric W. Teather, Elkton, MD (US); Steven William Macmaster, Springfield, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/397,639

(22) Filed: Mar. 4, 2009

(65) Prior Publication Data

US 2009/0225416 A1    Sep. 10, 2009

Related U.S. Application Data

(60) Provisional application No. 61/068,000, filed on Mar. 4, 2008.

(51) Int. Cl.
G03B 21/56 (2006.01)
G03B 21/60 (2006.01)
(52) U.S. Cl. ..................... 359/449; 359/452
(58) Field of Classification Search ............... 359/443, 359/449, 452, 459
See application file for complete search history.

(56) References Cited

U.S. PATENT DOCUMENTS

| | | | |
|---|---|---|---|
| 3,752,733 A | 8/1973 | Graham et al. | |
| 3,922,424 A * | 11/1975 | Andersen | 442/102 |
| 5,140,460 A * | 8/1992 | Fukuhara et al. | 359/445 |
| 5,456,967 A | 10/1995 | Nezu | |
| 6,040,941 A | 3/2000 | Miwa | |
| 6,144,491 A | 11/2000 | Orikasa et al. | |
| 6,404,548 B1 * | 6/2002 | Tatsuki et al. | 359/449 |
| 6,530,664 B2 * | 3/2003 | Vanderwerf et al. | 353/74 |
| 7,057,812 B2 | 6/2006 | Sinkoff | |
| 7,253,953 B2 * | 8/2007 | Browning | 359/452 |

FOREIGN PATENT DOCUMENTS

EP       1550910       7/2005

OTHER PUBLICATIONS

PCT International Search Report and Written Opinion for International Applicaiton No. PCT/US2009/036006 Mar. 4, 2008.

* cited by examiner

*Primary Examiner* — Christopher Mahoney

(57) ABSTRACT

A reflection-type projection screen is provided having uniformly high gain over a wide range of viewing angles. The projection screen includes a dual-purpose light reflective, supportive substrate including at least one unpigmented flash-spun plexifilamentary film-fibril sheet having a light reflectance of greater than about 85% and a gloss of less than about 10% when measured at a 60° incident angle, and an optical diffusion layer of a light transmissive melt-processible polymer containing diffusion-enhancing particles covering at least one surface of the substrate. The projection screen has an optical gain of between about 0.90 and about 2.0 and the optical gain deviates by no more than about 8% over viewing angles between −60° and +60°. The projection screen has good drapeability, rollability the ability to lay and hang flat. The projection screen can also be recycled.

7 Claims, 3 Drawing Sheets

REFLECTION-TYPE PROJECTION SCREEN

CROSS REFERENCED TO RELATED APPLICATION

This application claims priority under 35 U.S.C. §119 from U.S. Provisional Application Ser. No. 61/068,000 (filed Mar. 4, 2008), the disclosure of which is incorporated by reference herein for all purposes as if fully set forth.

BACKGROUND OF THE INVENTION

1. Field of the Invention

The present invention relates to an improved reflection-type projection screen comprising a substrate and a diffusion layer having a high optical gain and a high degree of diffuse reflectance.

2. Description of the Related Art

Reflection-type projections screens are used in conjunction with projectors to display images and video. Dimming of ambient light is often required in order to clearly view the images without reduction of visual contrast. Image clarity can be improved by using a higher powered projector and/or by increasing the reflected luminance, also referred to as optical gain of the projection screen. However, when designing a projection screen to have gain greater than 1.0, it is typical to encounter "hot spotting." Hot spotting occurs when the gain of the screen is greater when viewing at a normal incident angle and less when viewing from side angles. With "hot spotting," the center of the image appears brighter than the edges of the image for those viewing from side angles as a result of insufficient light diffusion. In settings such as movie theaters, classrooms, office presentation areas and home viewing areas, the viewer is often times positioned at a significant angle with respect to the direction of the projected image from the projector, i.e. the direction of incident projected light; therefore, the screen is required to have an effective viewing angle greater than would be possible if a highly reflective (i.e., specular) projection screen were used. It would be desirable to have a projection screen with uniformly high gain over a wide viewing angle without the tendency for hot spotting.

The desirability of producing reflection-type projection screens that can be draped, rolled or wound up and that either lay or hang flat under slight tension with no puckering, wrinkling or ripples formed from being wound and unwound is well established. Projection screens are known utilizing polyvinyl chloride (vinyl) fabric as a drapeable substrate. Typical vinyl screens incorporate a pigment, e.g. titanium dioxide, to make the surface moderately reflective, and make use of an embossed surface to get moderately diffuse reflection and thereby a wide viewing angle. Pigmented vinyl generally has a gain of less than 1.5. Specialized screens may include a reflective layer on a supporting substrate or fabric and a diffusion film on the reflective layer to achieve the desired optical properties. To create a screen that will lay or hang flat, a soft vinyl layer can be coated or adhered onto a woven scrim such that the vinyl layer provides the non-creasing reflective screen surface and the scrim provides dimensional stability.

While vinyl, optionally containing plasticizers to provide low-temperature flexibility and weldability, is effective at providing drapeability, rollability and lay/hang flat characteristics, it is known to have disadvantages from an environmental perspective, both during production of the vinyl that goes into the projection screen and after the useful life of the projection screen, since vinyl is difficult to recycle, and there are inherent hazards in disposing of vinyl via incineration and/or landfill. Organic plasticizers used to achieve desired mechanical properties in vinyl can also diffuse from the material over time resulting in indoor exposure to volatile organic compounds (VOCs). It would be desirable to have a projection screen with the desired drapeability, rollability and lay flat characteristics without the environmental disadvantages associated with the use of vinyl.

U.S. Pat. No. 7,057,812 (Sinkoff) discloses a projection screen including a substrate having at least a first surface, a reflective layer having a first surface and an opposing second surface, and diffusion layer having a first surface defined by a matte finish and an opposing second surface. The second surface of the reflective layer is attached (e.g., via an adhesive) to the first surface of the substrate and the second surface of the diffusion layer is attached (e.g., via an optically transparent adhesive) to the first surface of the reflective layer. The second surface of the diffusion layer has a preferably smooth finish, but may include desired irregularities to achieve a desired screen directivity or directionality performance.

U.S. Pat. No. 6,144,491 (Orikasa et al.) discloses a reflection-type projection screen having a substrate, a light reflecting layer made from a transparent resin in which flakes of a light-reflective material are dispersed, and a transparent diffusion layer made from a transparent resin in which fine crystalline particles of calcite and a pigment are dispersed. The films are undesirably complicated, expensive and difficult to achieve.

U.S. Pat. No. 6,040,941 (Miwa) discloses a reflection-type projection screen having a light-reflecting substrate laminated to a light-transmitting polymer layer having light absorptive slits or "crazes" of regular directionality disposed therein. The slits are filled with a light-absorbing substance such as a black pigment or dye.

U.S. Pat. No. 5,456,967 (Nezu) discloses a reflection-type screen of the type that can be wound up in a roll form and unwound as needed and comprises a substrate sheet to which is laminated a high-density diffusion-reflection layer and a translucent light diffusion layer including a soft vinyl chloride sheet, the translucent light diffusion layer having a surface provided with a light-diffusing fine uneven pattern.

It would be desirable to economically produce a reflection-type projection screen having good drapeability, rollability, and lay/hang flat characteristics that is recyclable, and provides uniformly high gain over a wide range of viewing angles.

SUMMARY OF THE INVENTION

The invention is directed to a reflection-type projection screen comprising:

a) a dual-purpose light reflective, supportive substrate having a front surface and rear surface comprising at least one unpigmented flash-spun plexifilamentary film-fibril sheet having a thickness between about 5 mils and about 15 mils and having a light reflectance of greater than about 85% and a gloss of less than about 10% when measured at a 60° incident angle; and b) an optical diffusion layer covering the front surface of the substrate having a thickness between about 0.2 mil and about 15 mils comprising a light transmissive melt-processible polymer containing diffusion-enhancing particles;

wherein the projection screen has an optical gain of between about 0.90 and about 2.0 and wherein the optical gain deviates by no more than about 8% over viewing angles between −60° and +60°.

DETAILED DESCRIPTION OF THE INVENTION

Figure 1:
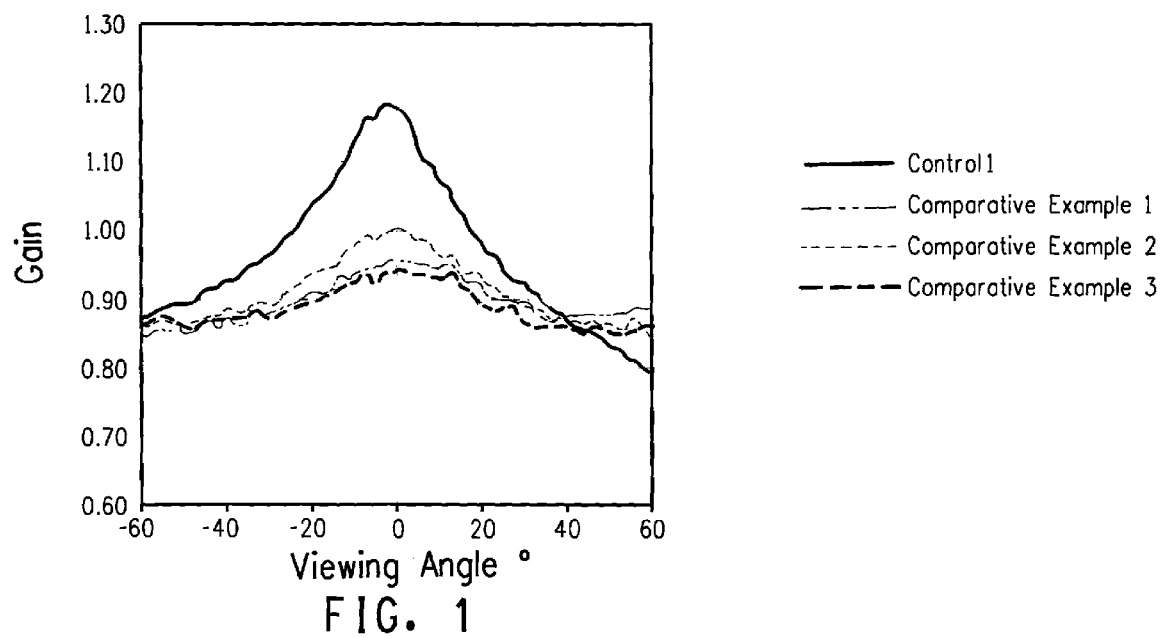
FIG. 1 is a graph depicting the optical gain of comparative and control projection screens over a range of viewing angles.

Optical gain of a screen, also referred to herein as gain, is a measure of the light reflected by the screen as compared with the light reflected by a test standard, when the measurement is taken for incident light directed to the screen and reflected perpendicular or normal to the screen.

A surface having a high degree of diffuse reflectance is characterized by scattering of incident light, so that the luminance of the surface is generally more uniform over a wide range of viewing angles as compared with a surface having a high degree of specular reflectance. Increasing the amount of scattering of light typically results in a decrease in the gain of reflected light at normal (perpendicular) incidence and an increase in the gain of reflected light at oblique viewing angles, thereby reducing hot spotting.

The projection screen according to the invention comprises a dual-purpose diffusely reflective, supportive substrate having at least one unpigmented flash-spun plexifilamentary film-fibril sheet and a diffusion layer containing diffusion-enhancing particles.

The projection screen of the invention maximizes the viewing angle while maximizing gain and minimizing the occurrence of hot spotting. The projection screen has a gain of between about 0.9 and about 1.2, even between about 0.9 and about 1.4, even between about 0.9 and about 1.6, even between about 0.9 and about 1.8 and even between about 0.9 and about 2.0. Despite the high gain, the gain of the screen surface is "flat," i.e., uniform across a wide range of viewing angles thus eliminating the occurrence of hot spotting. A matte white surface is an example of a flat diffuse surface that reflects projected light uniformly when viewed from any angle, and therefore provides superior image clarity. The gain of the projection screen deviates by no more than about 8% over viewing angles between −60° and +60°, and even by no more than about 4% and even by no more than about 2%.

According to the present invention, the use of a substrate having a reflectance of greater than about 85%, even greater than about 90%, even greater than about 95% and even greater than about 98%, provides the projection screen with an optical gain greater than about 0.9. Diffuse reflectance can be defined as total reflectance of light minus specular reflectance. Specular reflectance is directly proportional to gloss which can be measured. Diffuse reflectance is inversely proportional to gloss. A surface having a gloss of zero would be considered fully diffuse.

The substrate of the screen of the invention serves the dual purpose of acting as a reflective layer and a dimensionally stable support layer. The substrate has sufficient mechanical integrity to demonstrate good drapeability, rollability, and lay/hang flat characteristics. The tensile strength of the substrate is advantageously between about 7 lb/in and about 72 lb/in as measured according to ASTM D5035. The elongation to break of the substrate is advantageously between about 10% and about 28% is measured according to ASTM D5035. The Elmendorf tear strength of the substrate is advantageously between about 0.5 lb and about 1.3 lb is measured according to ASTM D1424. The delamination strength of the substrate is advantageously between about 0.08 lb/in and about 0.8 lb/in as measured according to ASTM D2724.

The projection screen of the invention has higher tensile strength than cast or calendered vinyl films at the same thickness. Flexibility without excessive potential for creep is required to provide ability to be rolled up and to lay and/or hang flat for hanging projection screens. The substrate for use in the projection screen is at least one layer of flash-spun plexifilamentary film-fibril sheet, such as high density polyethylene sheet commercially available from E. I. du Pont de Nemours & Co. under the trade name Tyvek®. The flash-spun sheet can be formed of a polymer selected from the group consisting of polyethylene, polypropylene, polyesters, acetyl polyoxymethylene resin and polyamides. Each flash-spun layer in the substrate is between about 5 mils and about 15 mils average thickness. Two or more substrate layers can be used for increased opacity, reflectance or mechanical stiffness.

The diffusion layer diffuses light reflected by the substrate without significant loss of gain, and conceals the fibril pattern of the substrate. The diffusion layer is between about 1 mil and about 20 mils thick, even between about 2 mils and about 8 mils thick. If the diffusion layer is too thick, the gain of the projection screen is reduced. If the diffusion layer is too thin, hot spotting results.

Suitable polymers for use in the diffusion layer include light transmissive (i.e., transparent or translucent) melt-processible polymers. Polymers that form crystalline or semi-crystalline structures with domain sizes corresponding to wavelengths of visible light (less than about 1 μm) interdispersed with noncrystalline or amorphous polymers with different refractive indices also serve to scatter light to similar effect as diffusion-enhancing particles. Suitable polymers for use in the diffusion layer include polyethylene polymers including high density polyethylene, low-density polyethylene, linear low-density polyethylene and MPE (metallocene catalyzed polyethylene), modified polyethylene and polyethylene polymer blends; polypropylene including polypropylene homopolymer and copolymer of propylene and ethylene; ethylene copolymers including copolymers of ethylene and vinyl acetate (EVA), copolymers of ethylene and ethyl hydrogen maleate (MAME), also referred to as E/MAME, copolymers of ethylene and acrylates, such as methyl acrylate and n-butyl acrylate; and blends of ethylene copolymer with E/MAME, e.g., blends of E/MAME with EVA, and blends of E/MAME and copolymers of ethylene and acrylates. The diffusion layer can be cast or extruded onto the surface of the substrate, thermally laminated or adhesively laminated to the substrate.

The polymer permeates the surface of the substrate somewhat to provide adhesion levels resulting in delamination strengths of 0.3 lb/in or greater. In addition to transmitting and diffusing light, the diffusion layer advantageously enhances lay flat/hang flat characteristics of the projection screen.

The diffusion layer further contains diffusion-enhancing particles to scatter light and even the gain across the viewing angles, resulting in a relatively flat gain curve. The particles serve as scattering centers and increase the amount of diffusion without reduction of total reflectance. In addition such particles mask the film-fibril pattern on the surface of the substrate. Suitable particles include pigments, metal flakes, and micro-lenses and microglass beads used in non-imaging geometric optics. Suitable pigments include silicates, alkali metal carbonates, alkali earth metal carbonates, alkali metal titanates, alkali earth metal titanates, alkali metal sulfates, alkali earth metal sulfates, alkali metal oxides, alkali earth metal oxides, transition metal oxides, metal oxides, alkali metal hydroxides and alkali earth metal hydroxides. Specific examples including titanium dioxide, calcium carbonate, clay, mica, talc, hydrotalcite, magnesium hydroxide, silica, silicates, hollow silicate spheres, wollastonite, feldspar, kaolin, magnesium carbonate, barium carbonate, magnesium sulfate, barium sulfate, calcium sulfate, aluminum hydroxide, calcium oxide, magnesium oxide, alumina, asbestos powder, glass powder and zeolite. Typical pigment particle diameters range from about 0.10 μm to about 0.44 μm. Particle loading in the diffusion layer is between about 1% by weight to less than about 10% by weight of the diffusion layer, even less than about 6% by weight and even less than about 3% by weight.

The diffusion layer can further include flame retardant additives to allow the total composite to meet regulatory standards required for indoor use, such as NFPA 701, "Standard Methods of Fire Tests for Flame Propagation of Textiles and Films." Most common types of flame retardant systems used for polyolefins include a halogenated quencher type compound which acts in the vapor phase to quench free radicals and halt the combustion reaction and a metal oxide synergist which functions to carry the halogen into the flame by forming vaporizable oxyhalide compounds. Suitable halogenated compounds include decabromodiphenyloxide, octabromodiphenyloxide, tetrabromobisphenol-A diglycidyl ether, ethylenebistetrabromophthaliamide, septabromotrimethylphenyl indane, octabromotrimethylphnol indane and tetrabromobisphenol A, bis (2,3-dibromopropyl ether). Suitable metal oxide synergists include antimony trioxide, antimony pentoxide and sodium antimonite. As an alternative to a halogenated/synergist flame retardant system, inorganic flame retardants systems including ammonium polyphosphate, red phosphorus, magnesium dihydroxide (MDH), aluminum trihydroxide (ATH), zinc borate may be used. These may also be combined with halogenated systems or newer non-halogenated compounds such as triazine (e.g., Ciba® FLAMESTAB® NOR™ 116) or EDAP (ethyl diamine phosphate salt).

Additional additives can be included in the diffusion layer such as, for instance, antioxidants, anti-yellowing agents, UV adsorbers, free radical scavengers and photostabilizers. Optical brighteners that absorb UV light and emit energy in the visible spectrum may be added to increase brightness or gain and/or add a blue tint.

An additional layer of polymer can be cast, extruded or laminated to the rear or non-viewing surface of the screen. The additional layer can be used to improve lay/hang flat characteristics and reduce edge curling of the screen. Carbon black or a similar light-adsorbtive pigment can be added to the polymer used to coat the non-viewing side of the screen to impart opacity so that ambient light from other sources does not show through the screen. A concentration of carbon black or grey pigment between about 1% and about 6% by weight is required to achieve "blackout" or complete opacity.

The substrate and the diffusion layers of the projection screen are advantageously recyclable. In particular, when E/MAME is used in the diffusion layer, the E/MAME assists with the dispersion of additives in order to form a homogeneous composition and thereby improve the mechanical properties of the composition.

TEST METHODS

Gain

The gain of a screen sample is determined by dividing the angular luminance of the sample over a specific range of angles by the angular luminance of a known test standard. The standard is a NIST traceable Spectralon® diffuse white standard commercially available from Labsphere, Inc. (North Sutton, N.H.) mounted on a goniometer tilted −5° atop a 12-inch 360° rotation stage available from Newport Corporation (Irvine Calif.). A uniform illuminate "A", 2856K, collimated light source available from Labsphere, Inc. was mounted to the rotation stage at a distance of 50 cm from the diffuse standard at −5° illuminating a 15 mm spot on the standard's surface so that the illumination angle and distance of light source remained constant and traveled with the sample as it is rotated. A Photo Research PR-1980B Prichard Spectroradiometer, available from Photo Research, Inc. (Chatsworth, Calif.), was mounted normal to rotation stage. With the illumination source on and stabilized, luminance measurements were taken at 5° intervals and recorded. Once the standard measurement was completed, the projection screen samples were mounted in place of the standard and an identical measurement of the sample was taken and recorded. The sample measurements at each angle were then divided by the like measurement of the standard resulting in the gain of the sample at viewing angles ranging between −60° and +60°. This gain data at each angle was then plotted.

Reflectance

Reflectance at five locations on each sample was measured using a calibrated SP-64 Sphere Spectrophotometer, available from X-Brite, Inc. (Grand Rapids, Mich.) with the average of reflectance at wavelengths in the range between 400 nm and 700 nm reported as well as the reflectance at a wavelength of 550 nm, nearest to the peak of the eye's photopic response.

Gloss

The specular gloss of each sample was measured according to ASTM D523 using a GL-4601 Haze-Gloss Meter, available from Paul A. Gardner Company, Inc. (Pompano Beach, Fla.) at the identical five points at which the reflectance was measured. Average gloss measurements were reported for incident angles of 20°, 60°, and 85°.

EXAMPLES

Samples of high-density polyethylene flash-spun plexifilamentary film-fibril sheet available from E. I. du Pont de Nemours & Co. (Wilmington, Del.) under the trade name Tyvek® were tested for optical gain over a range of viewing angles of −60° to +60°. As listed in Table 1, Control Samples 1 and 2 having no diffusion layer, and examples of screen of the invention having at least one diffusion layer (Examples 1-7) were tested. In each of the examples, the diffusion layer was a blend of 80% by weight of the total blend of a copolymer of ethylene and methyl acrylate (melt flow index of 8.0 as measured at 190° C.) and 20% by weight of the total blend of a copolymer of ethylene and MAME. The copolymer of ethylene and methyl acrylate was 80% by weight ethylene and 20% by weight methyl acrylate. The E/MAME copolymer was 90.5% by weight ethylene and 9.5% by weight MAME. Titanium dioxide (DuPont TiPure® R104) was added in an amount of 2% or 3% based on the weight of the blend. The blend was extrusion coated onto the substrate to form the diffusion layer. Additionally, a flame retardant system comprised of 2% Triazine (Flamestab® NOR116 available from Ciba) and 7% tetrabromobisphenol A, bis (2,3-dibromopropyl ether) and antimony trioxide was added in Examples 2, 3 and 5. Also in Examples 2, 3 and 5, a package including a UV absorber, anti-oxidizing and anti-yellowing were added together at 1%.

Table 1 lists the average optical gain over the range of angles tested for Control Samples 1 and 2, Examples 1-7 and three samples of commercially available matte white vinyl screens (Comparative Examples 1-3). Comparative Example 1 was a commercially available screen from 3M designated Vinyl PS, composed of a white vinyl embossed film laminated onto a fiberglass woven fabric and including a black vinyl film backing; Comparative Example 2 was a commercially available screen designated Draper FG White, composed of white vinyl embossed film laminated onto a fiberglass woven fabric and including a black vinyl film backing; and Comparative Example 3 was another commercially available screen designated Draper M1300, composed of an unsupported white vinyl film.

Figure 2:
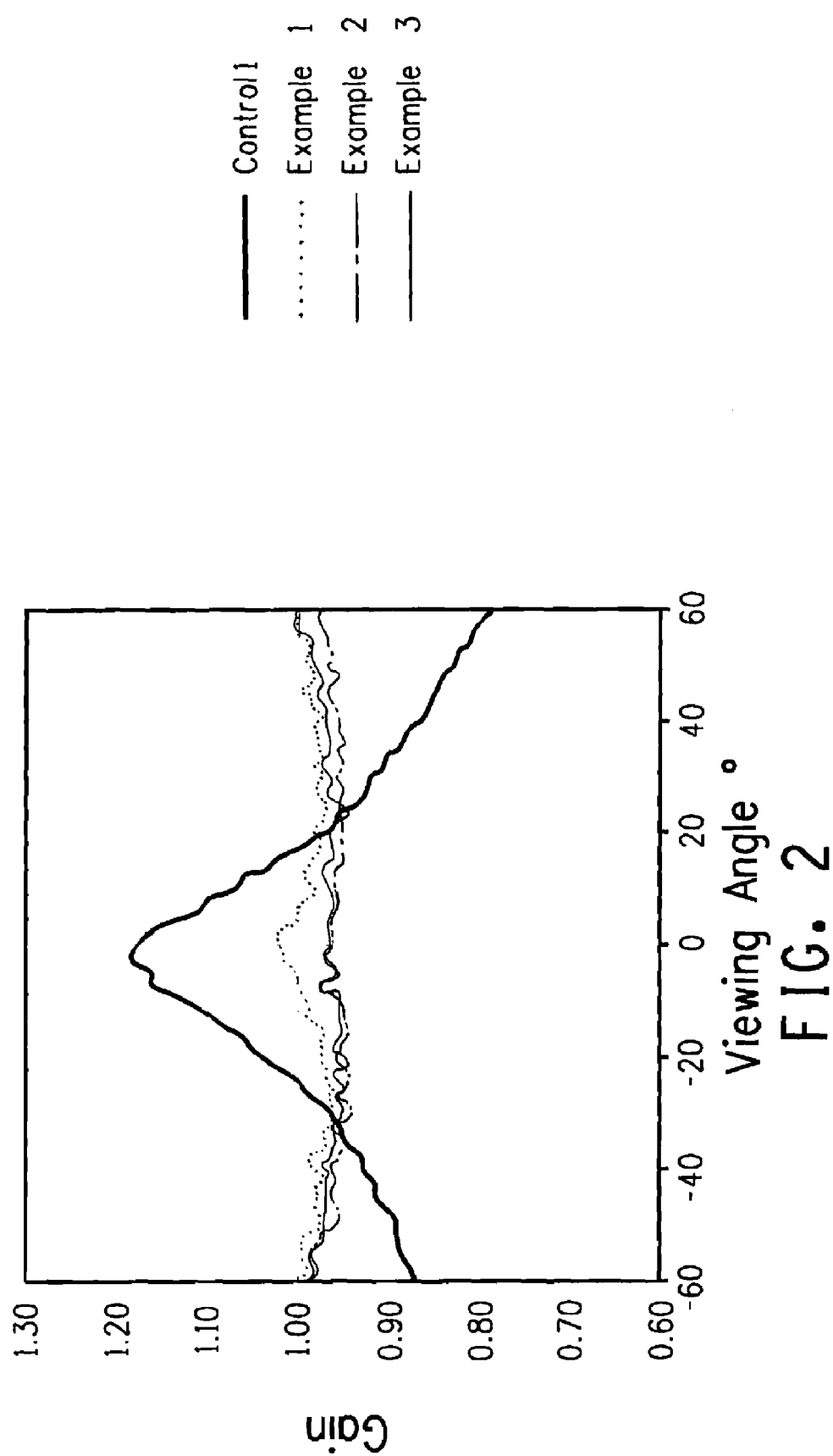
FIGS. 2 and 3 are graphs, each depicting the optical gain over a range of viewing angles of an uncoated control sample and three coated samples according to the invention.
Figure 3:
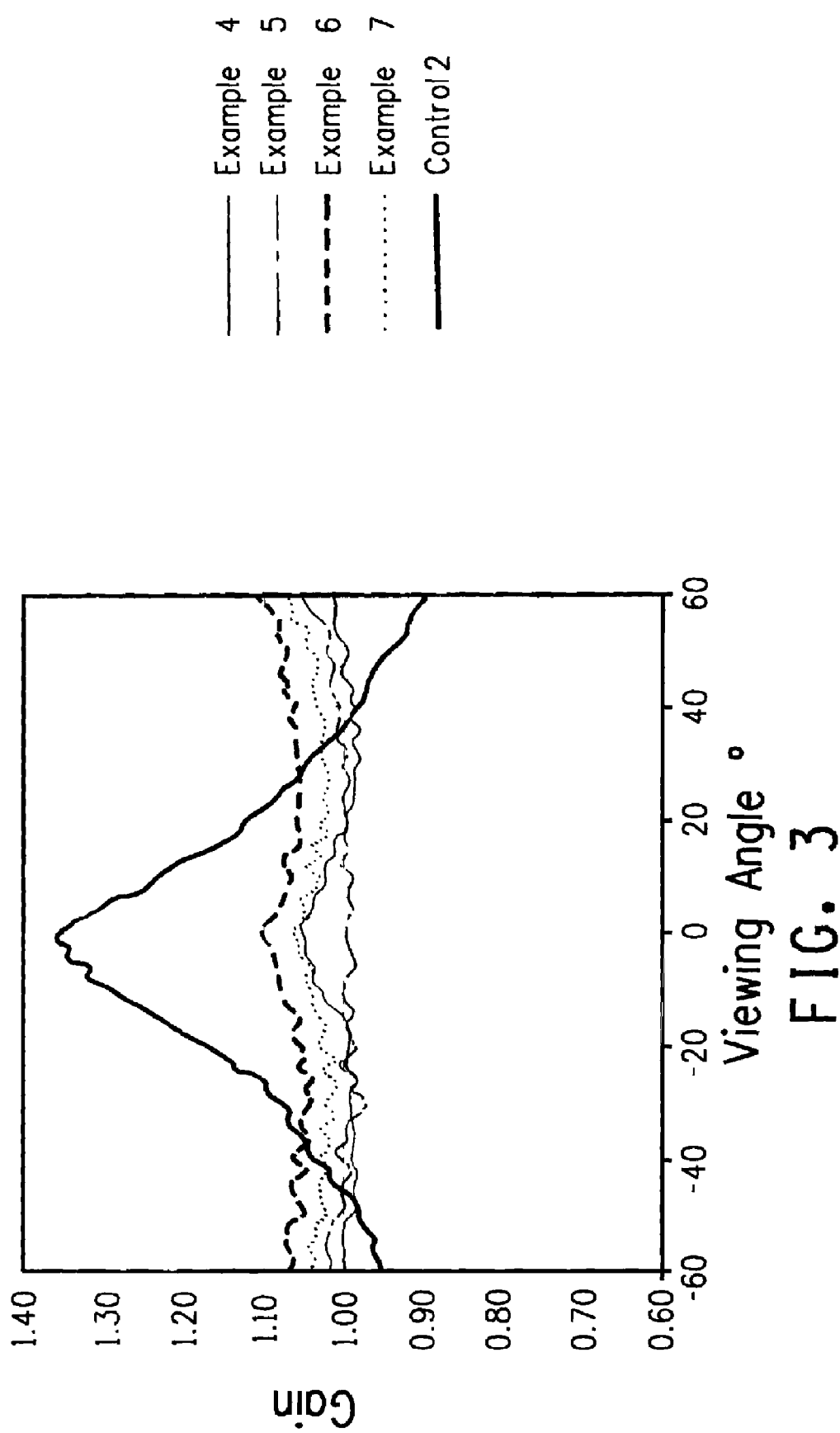

FIG. 1 shows the gain graphically over the angles tested for Comparative Examples 1-3, and Control Sample 1. FIG. 2 shows the gain graphically over the angles tested for Examples 1-3, and FIG. 3 the gain graphically over the same angles tested for Examples 4-7. The uncoated Control Samples, having no diffusion layer, exhibited a desirably high maximum optical gain of between about 1.18 and about 1.4; however, these samples exhibited an undesirably narrow viewing angle due to hot spotting. Hot spotting can be seen graphically in FIG. 1 by the shape of the gain curve, having a peak at the normal (incident angle of 0°), and numerically by a standard deviation of gain above 11%. By contrast, the standard deviation of the gain of the invention examples was less than 2%. The diffusion layer of E/MAME and diffusion-enhancing particles of pigment served to control the optical gain of the screen uniform and eliminate hot spotting.

TABLE 1

| Sample | | | | Gain | | |
|---|---|---|---|---|---|---|
| Coating Thickness (mils) | % TiO2 | No. of sides coated | Average | Std. Dev. (%) | Max. | Min. |
| Control 1 | 0 | 0% | NA | 0.97 | 11.0% | 1.18 | 0.79 |
| Example 1 | 4 | 3% | 2 | 0.99 | 1.5% | 1.03 | 0.96 |
| Example 2 | 4 | 2% | 2 | 0.96 | 1.0% | 0.98 | 0.95 |
| Example 3 | 5 | 2% | 2 | 0.97 | 1.4% | 1.02 | 0.95 |
| Control 2 | 0 | 0% | NA | 1.09 | 13.3% | 1.36 | 0.90 |
| Example 4 | 4 | 3% | 1 | 1.00 | 2.0% | 1.05 | 0.98 |
| Example 5 | 4 | 2% | 2 | 1.00 | 1.3% | 1.05 | 0.98 |
| Example 6 | 4 | 3% | 2 | 1.07 | 1.6% | 1.11 | 1.04 |
| Example 7 | 8 | 3% | 2 | 1.03 | 1.4% | 1.07 | 1.01 |
| 3M Vinyl PS | | | | 0.90 | 3.3% | 0.96 | 0.84 |
| Draper FG White | | | | 0.91 | 4.7% | 1.00 | 0.85 |
| Draper M1300 | | | | 0.89 | 3.0% | 0.94 | 0.85 |

Table 2 includes reflectance and gloss measurements taken on substrate samples of Tyvek® 1085D, 1443R and 1079 (uncoated) as well as commercially available samples of RE240 microvoided polyester film available from Teijin DuPont Films Japan Ltd. (Tokyo, Japan), MCPET foamed microcellular polyester sheet available from Furukawa America, Inc. (Peachtree City, Ga.) and a commercial vinyl coated screen available from Draper, Inc. (Spiceland, Ind.).

TABLE 2

| Sample | % Reflectance | | % Gloss | | |
|---|---|---|---|---|---|
| | Ravg | R550 | 20 | 60 | 85 |
| Tyvek ® 1085D | 91.94 | 92.24 | 2.1 | 8.4 | 5.0 |
| Tyvek ® 1079 | 85.41 | 85.56 | 2.0 | 7.9 | 6.2 |
| Tyvek ® 1443R | 88.64 | 89.22 | 1.9 | 7.8 | 5.2 |
| DTF RE240 | 97.03 | 98.28 | 7.4 | 48.5 | 89.3 |
| MCPET | 97.59 | 98.74 | 96.3 | 96.8 | 96.6 |
| Draper FG White | 79.89 | 81.81 | 1.6 | 5.0 | 3.4 |

What is claimed is:

1. A reflection-type projection screen comprising:
   a) a dual-purpose light reflective, supportive substrate having a front surface and rear surface comprising at least one unpigmented flash-spun plexifilamentary film-fibril sheet having a thickness between about 5 mils and about 15 mils and having a light reflectance of greater than about 85% and a gloss of less than about 10% when measured at a 60° incident angle; and
   b) an optical diffusion layer covering the front surface of the substrate having a thickness between about 0.2 mil and about 15 mils comprising a light transmissive melt-processable polymer containing diffusion-enhancing particles;
   wherein the projection screen has an optical gain of between about 0.90 and about 2.0 and wherein the optical gain deviates by no more than about 8% over viewing angles between −60° and +60°.

2. The projection screen of claim 1 wherein the optical diffusion layer contains less than about 10% by weight of diffusion-enhancing particles based on the weight of the melt-processable polymer.

3. The projection screen of claim 1 wherein the substrate comprises a polymer selected from the group consisting of polyethylene, polypropylene, polyester, acetyl polyoxymethylene resin, polyamide.

4. The projection screen of claim 1 wherein the optical diffusion layer comprises a polymer selected from the group consisting of polyethylene polymers and blends, polypropylene polymers, copolymers of propylene and ethylene, ethylene copolymers, copolymers of ethylene and vinyl acetate, copolymers of ethylene and acrylate, blends of ethylene copolymers, blends of ethylene copolymers with E/MAME and E/MAME.

5. The projection screen of claim 1 wherein the diffusion-enhancing particles comprise a pigment selected from the group consisting of titanium dioxide and calcium carbonate.

6. The projection screen of claim 1 further comprising a backing layer covering the rear surface of the substrate comprising melt-processable polymer containing an opacifying agent.

7. The projection screen of claim 1 wherein the diffusion layer is formed on the surface of the substrate by casting, extrusion, thermal lamination or adhesive lamination.

* * * * *